United States Patent [19]

Sakakibara et al.

[11] Patent Number: 5,065,179
[45] Date of Patent: Nov. 12, 1991

[54] MICROFILM READER-PRINTER

[75] Inventors: Katsunori Sakakibara, Fujisawa; Hajime Otsuki, Yokohama; Kenjiro Ishii; Yasuhide Kokura, both of Sagamihara, all of Japan

[73] Assignee: Minolta Camera Kabushiki Kaisha, Osaka, Japan

[21] Appl. No.: 629,587

[22] Filed: Dec. 18, 1990

[30] Foreign Application Priority Data

Dec. 26, 1989 [JP] Japan .................................. 1-334987

[51] Int. Cl.$^5$ ............................................. G03B 13/28
[52] U.S. Cl. ...................................................... 355/45
[58] Field of Search ...................... 355/43, 45, 271, 41

[56] References Cited

U.S. PATENT DOCUMENTS

| | | | |
|---|---|---|---|
| 3,733,128 | 5/1973 | Naumann et al. | 355/45 |
| 4,278,346 | 7/1981 | Toriumi et al. | 355/45 |
| 4,603,966 | 8/1986 | Brownstein | 355/45 |
| 4,825,243 | 4/1989 | Ito et al. | 355/41 |
| 4,873,552 | 10/1989 | Otsuki | 355/271 |
| 4,958,186 | 9/1990 | Sashida | 355/45 X |
| 4,989,033 | 1/1991 | Yamashita | 355/45 X |

FOREIGN PATENT DOCUMENTS 55-9582  1/1980  Japan .

OTHER PUBLICATIONS

U.S. patent application Ser. No. 542,268 (filed Jun. 22, 1990) (Pending).

Primary Examiner—Richard A. Wintercorn
Attorney, Agent, or Firm—Price, Gess & Ubell

[57] ABSTRACT

A microfilm reader-printer having a reader mode for projecting an image of a microfilm onto a screen and a printer mode for printing the image on a copy paper. The screen is provided with indexes indicative of a plurality of sizes of a copy paper. For a copy paper of a size larger than a certain size, the index indicates a smaller size than the size of the copy paper. A lens of variable magnification type is used so that the magnification of the projection lens for the reader mode is made smaller than the magnification for printer mode when a copy paper of a size larger than the certain size is selected. The magnifications for the reader mode and printer mode are made equal to each other when a copy paper of a size smaller than or equal to the certain size is selected.

6 Claims, 11 Drawing Sheets

MICROFILM READER-PRINTER

BACKGROUND OF THE INVENTION

1. Field of the Invention

The present invention relates to a microfilm reader-printer, and particularly to a microfilm reader-printer operative in a printing mode to select a copy paper of an optimum size.

2. Description of the Prior Art

Conventional microfilm reader-printers are designed to print a magnified microfilm image, which is projected on the screen, in the same size on a copy paper, and the screen is dimensioned slightly larger than the largest copy paper used by the microfilm reader-printer. For example, when the copy papers has sizes of B5, A4 and B4, the screen has dimensions slightly larger than the B4 size.

In such a microfilm reader-printer operating with a variety of sizes of the copy paper, however, frequently used paper sizes in practice are intermediate sizes (e.g., A4 size), and the use of larger-sized copy paper (e.g., B4 size) is less frequent. The same is true on smaller-sized copy paper.

The conventional microfilm reader-printers are designed to deal with the largest paper size irrespective of the actual frequency of demand, resulting in a bulky apparatus with a high screen position which involves a problem of operability.

To cope with this matter, there is proposed a more compact microfilm reader-printer with a reduced screen size through the provision of a conversion lens in the optical reader system for projecting a microfilm image on the screen so that the projected image on the screen is smaller than the image printed on the cop paper, as described in Japanese Patent Application Laid-open No. Sho 55-9582. However, the apparatus of this design operates to project images of various sizes on the screen through the reduction in a constant size ratio with respect to the printed images, and therefore it is degraded as a reader in the performance of image resolution.

SUMMARY OF THE INVENTION

A prime object of the present invention is to provide a microfilm reader-printer which is operative to print an image on a copy papers of various sizes including a size larger than the screen size.

Another object of the present invention is to provide a microfilm reader-printer which is operative to print an image on a copy paper larger than the screen size by expanding the magnification of a projection lens thereby to achieve copying in a proper size for a selected paper size, in response to switching from a reader mode to a printer mode.

Other objects of the present invention will become apparent from the following detailed description taken in conjunction with the accompanying drawings.

DETAILED DESCRIPTION OF THE PREFERRED EMBODIMENT

Figure 1:
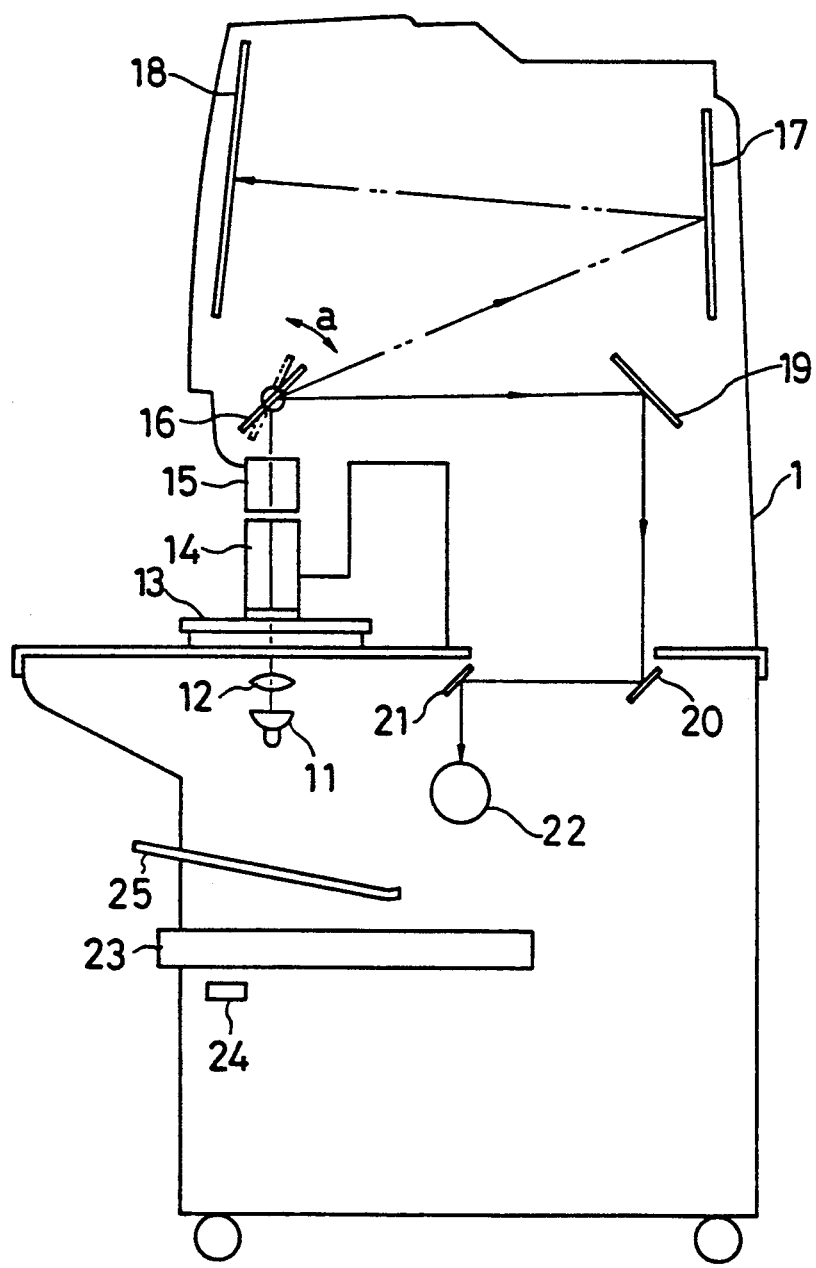
FIG. 1 is a side cross-sectional diagram of the microfilm reader-printer which embodies the present invention.

An embodiment of the present invention will be described. FIG. 1 is a side cross-sectional view of the microfilm reader-printer according to the present invention, and FIG. 2 is a perspective view of the microfilm reader-printer seen from the top front corner.

Figure 2:
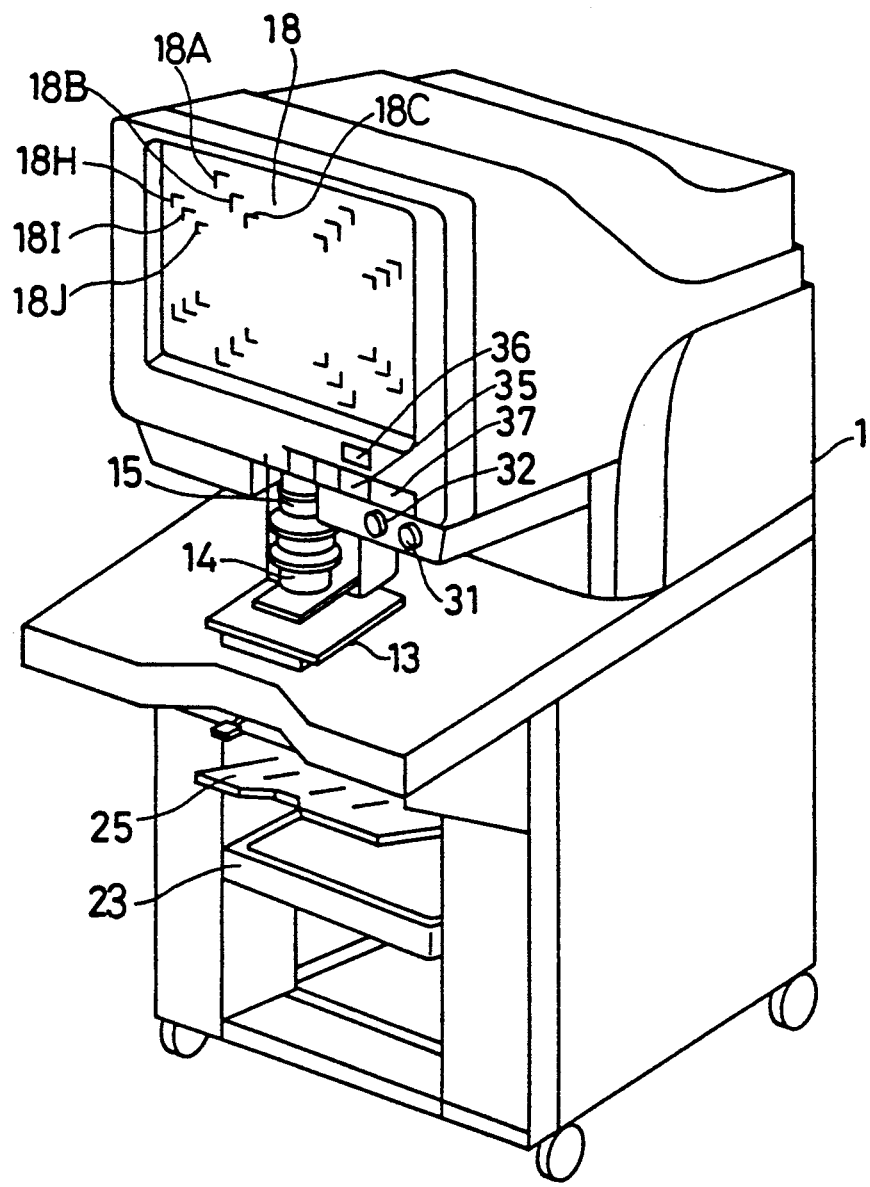
FIG. 2 is a perspective diagram of the microfilm reader-printer viewed from the top front corner.

In FIGS. 1 and 2, indicated by 1 is the main unit of the microfilm reader-printer, 11 is a light source, 12 is a condenser lens, 13 is a microfilm carrier, 14 is a projection lens equipped with an automatic zooming mechanism which will be explained later, 15 is an image rotation prism, and 16 is a scanning mirror which switches the light path for a reader system to a printer system and vice versa and also functions to scan a image on the microfilm in a printer mode. 17 is a reflection mirror on the light path of the reader system, and 18 is a screen which has marks 18A, 18B and 18C indicative of corner positions of a projected image having a vertically elongated profile and marks 18H, 18I and 18J indicative of corner positions of a projected image having a horizontally elongated profile.

Both types of images defined by the corner marks 18A, 18B and 18C as well as 18H, 18I and 18J have the same dimensions of the long and short sides, corresponding to vertically placed B4, A4 and B5 sizes and horizontally placed B4, A4 and B5 sizes. The areas defined by these corner marks represent the areas of images which are printed actually on copy paper selected in correspondence to the marks, and the areas on the screen are slightly smaller than the corresponding print sizes with the intention of preventing a deficient print area. Although in this embodiment the corner marks are located in a concentrical arrangement so that the center of the marked areas coincide with the optical axis of the projection lens, if the paper feed system operates by making reference to one side of paper, the corner marks need to be arranged so that one side of the marked areas are coincident. Although in this embodiment the corner marks are used to define the print areas on copy paper, other types of marks may be placed on the screen to accomplish the purpose.

Indicated by 19, 20 and 21 are reflection mirrors on the light path of printer system, 22 is a photosensitive drum, 23 is a paper supply cassette, 24 is a sensor for detecting the size of copy paper accommodated in the paper supply cassette, and 25 is a paper discharge tray. The paper supply cassette 23 is available in three sizes for accommodating copy paper of B4, A4 and B5 sizes, and one of them is mounted selectively. Accordingly, the microfilm reader-printer in this embodiment is capable of printing a microfilm image on copy paper of any of B4, A4 and B5 sizes. Although the illustrated microfilm reader-printer is equipped with the image forming facility based on the scheme of electrophotography, it is known in the art and therefore is not depicted in the figure.

Figure 3:
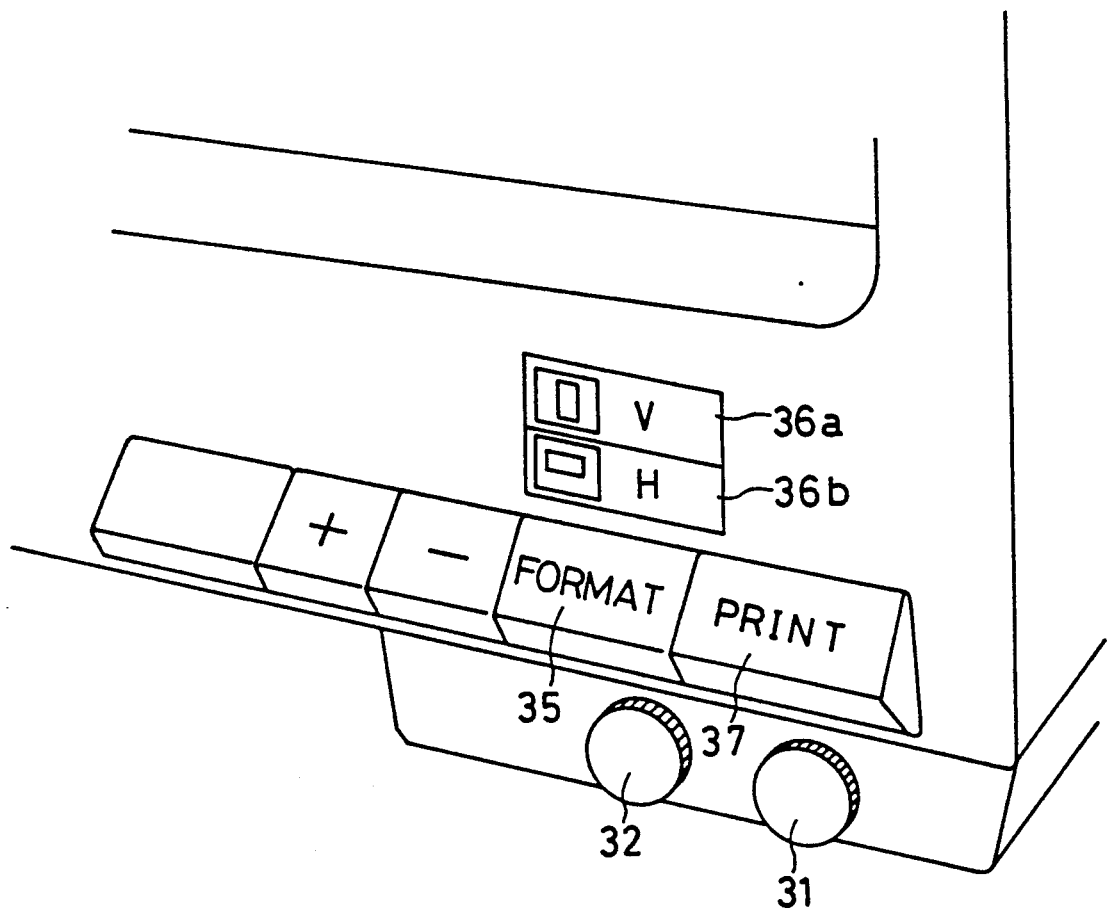
FIG. 3 is an enlarged perspective diagram showing in part the operation panel of the microfilm reader-printer.

FIG. 3 is an enlarged perspective view of the operation panel of the microfilm reader-printer. In the figure, indicated by 31 is a zoom dial used for the manual adjustment of magnification of the projection lens 14, 32 is a prism switch used for the manual rotation of the image rotation prism 15, and 35 is a format selection switch used to enter information as to whether the image is vertically elongated or horizontally elongated. The entered information is indicated on a format display LED 36a or 36b. 37 is a print key, and when it is turned on, the operational mode is switched from the reader mode to the printer mode, and the print operation is started.

Next, the operation of the microfilm reader-printer arranged as described above will be explained in brief.

When power supply switch is turned on, the reader mode is selected and the scanning mirror 16 is switched to take the light path of reader system. The light produced by the light source 11 is converged by the condenser lens 12 and projected on the microfilm which is placed on the microfilm carrier 13. The image on the film is conducted through the projection lens 14, image rotation prism 15, scanning mirror 16 and mirror 17, and projected by being magnified onto the screen 18.

For printing the image, the magnification of the projection lens 14 is adjusted so that the corners of the image are coincident with the corner marks 18A, 18B, 18C, 18H, 18I or 18J on the screen. The format selection switch 35 is operated to set as to whether the image projected on the screen is vertically elongated or horizontally elongated, and it is indicated on the format indicating LED 36a or 36b. Depending on this set-up information, activation or inactivation of image rotation is determined to meet the orientation of the supplied copy paper.

With the print key 37 being depressed to select the printer mode, the scanning mirror 16 is operated to take the light path of the printer system. The microfilm image irradiated by the light source 11 is conducted through the projection lens 14, image rotation prism 15, scanning mirror 16, reflection mirrors 19, 20 and 21, and projected on the photosensitive drum 22, on which a latent image is formed. The latent image is developed by toner and transferred to the copy paper as a visual image through the usual image processing based on the well-known scheme of electrophotography.

With the format selection switch 35 being set to specify that the image rotation is inactivated, the image rotation prism 15 does not rotate. With image rotation being specified, the operation of turning the image rotation prism 15 automatically is added, and the remaining operation is identical to the former case.

Figure 4:
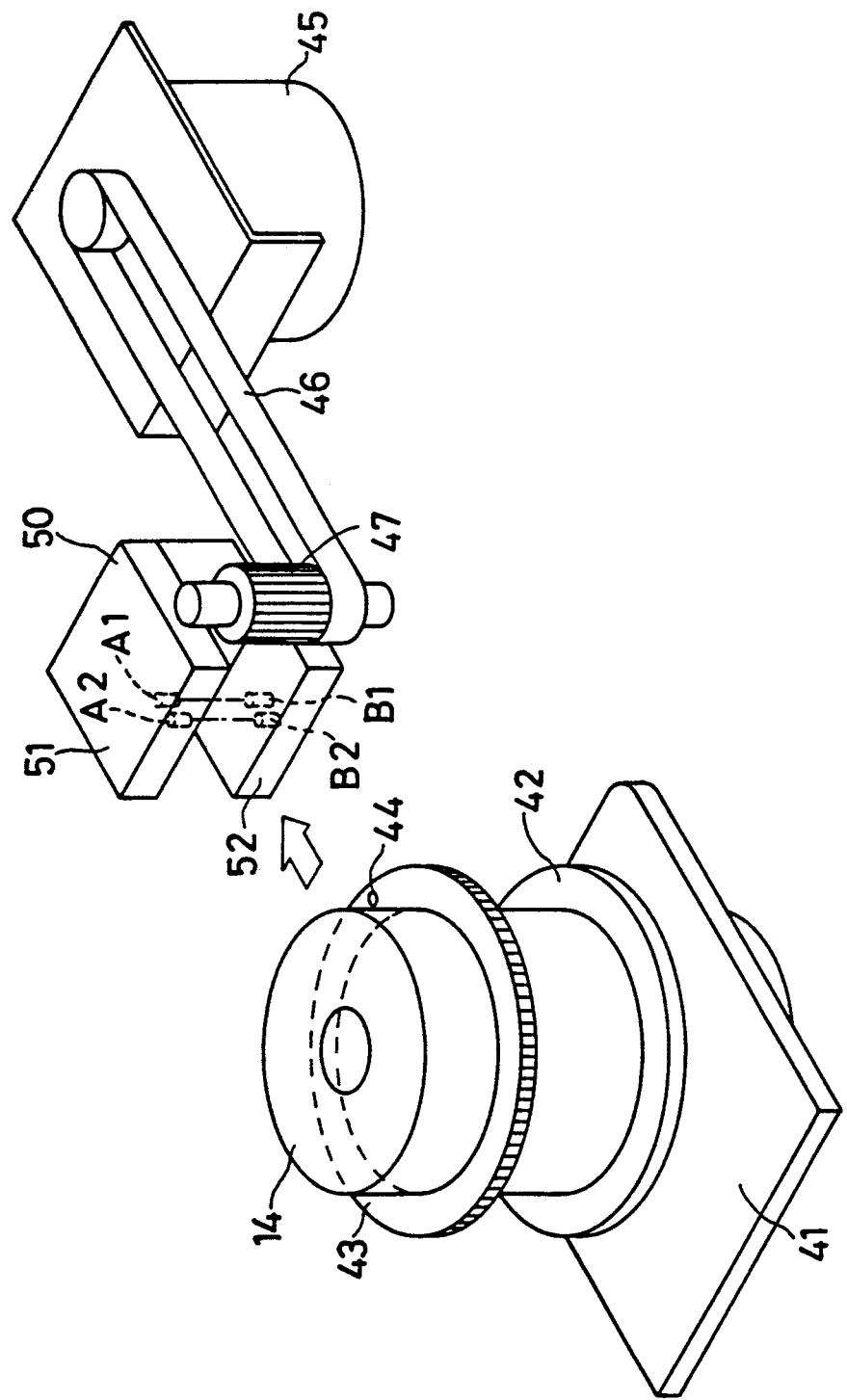
FIG. 4 is a perspective diagram showing the arrangement of the projection lens.

Next, the arrangement of the lens unit which includes the projection lens 14 will be explained with reference to FIG. 4. The microfilm reader-printer 1 is provided with a lens holder (not shown). The projection lens is mounted on a stage 41 which is inserted detachably in the lens holder. The projection lens 14 is a zoom lens which is operative with the auto zoom function, and is provided with a focus ring 42 used for the manual focus adjustment and a zoom gear 43 used for setting the focal distance (zoom ratio), with a hole 44 for reference magnification position detection being formed in the zoom gear 43. The lens holder is provided with a pinion 47, which is driven by a pluse motor 46 through a belt 46, and it engages with the zoom gear 43.

Disposed above and below the zoom gear 43 is a sensor unit 50 for detecting the reference magnification position detection hole 44. The sensor unit 50 consists of a light transmitter 51 made up of two light emitting elements $A_1$ and $A_2$ and a light receiver 52 made up of two light receiving elements $B_1$ and $B_2$. The reason for the provision of two sets of light emitting elements and light receiving elements is to identify two kinds of projection lenses. Setting of the reference magnification for the first lens is sensed when the detection hole 44 of the zoom gear 43 is located between the light emitting element $A_1$ and the light receiving element $B_1$, and the light emitted by the light emitting element $A_1$ has passed the detection hole 44 and is detected by the light receiving element $B_1$ to produce a detection signal. Setting of the reference magnification for the second lens is sensed when the light emitted by the light emitting element $A_2$ has passed the detection hole 44 and is detected by the light receiving element $B_2$ to produce a detection signal. Needless to say, the position of the detection hole 44 formed in the zoom gear 43 of the first lens and that of the second lens ar different and are designed to confront the respective light emitting elements and light receiving elements.

If the detection signals are produced by both of the light receiving elements $B_1$ and $B_2$, it is judged that no projection lens 14 is yet mounted, or if no detection signal is produced by any of the light receiving elements $B_1$ and $B_2$, it is judged that the projection lens 14 is mounted, but the reference magnification is not set. Another method of sensing the mount of the projection lens may be based on the detection of the opening or closing of a door provided at the lens stage.

Although in this embodiment the sensor unit consisting of two pairs of light emitting elements and light receiving elements used for the setting of the reference magnification is used in identifying the type of projection lens, an independent sensor unit for identifying the type of projection lens may be provided. For example, notches are formed in the lens holder 41 in correspondence to the types of lens, so that the type of projection lens is identified by the position or depth of the notches.

In the foregoing arrangement, once the projection lens 14, even without the setting of the reference magnification, is mounted, the projection lens 14 is driven to rotate by the pulse motor until the sensor unit 50 detects the reference magnification position detection hole 44, and the reference magnification is set. During the rotation, the number of pulses fed to the pulse motor is counted by a counter, which will be explained later, and stored in the memory. The memory stores a magnification calculation table which indicates the relationship between the number of pulses and the magnification. Based on the magnification calculation table and stored data of the number of pulses, the magnification of the mounted lens can be recognized. Moreover, in altering the current magnification to a certain magnification, the number of pulses for driving the lens can be known.

When the zoom dial is operated to adjust the magnification of the projection lens so that the projected image coincides with the corner marks indicative of the print area of the selected copy paper size, if the image is made coincident with the marks of smaller sizes (e.g., A4 or B5), in which the marked area is set to that of copy paper size (A4 or B5), it is not necessary to alter the size of projected image after the operational mode is switched to the printer mode. On the other hand, however, if the projected image is adjusted to a larger marked area (B4 in the following example), it is necessary to increase the size of projected image when the operational mode is switched to the printer mode and, after printing, the original size needs to be restored, due to the arrangement of the marked area smaller than the copy paper size (i.e., B4).

On this account, when the projected image is adjusted to the marked area of B4 size on the screen in the reader mode and copy paper of B4 size is selected, the magnification X of the projection lens at the time of the reader mode is memorized. Magnification control for the projection lens is implemented such that when the operational mode is switched to the printer mode, the magnification X for the reader mode is altered to a magnification Z suitable for the printing of B4 size, and, after printing, the magnification X for the reader mode is restored. This control operation will be explained in detail later.

Figure 5:
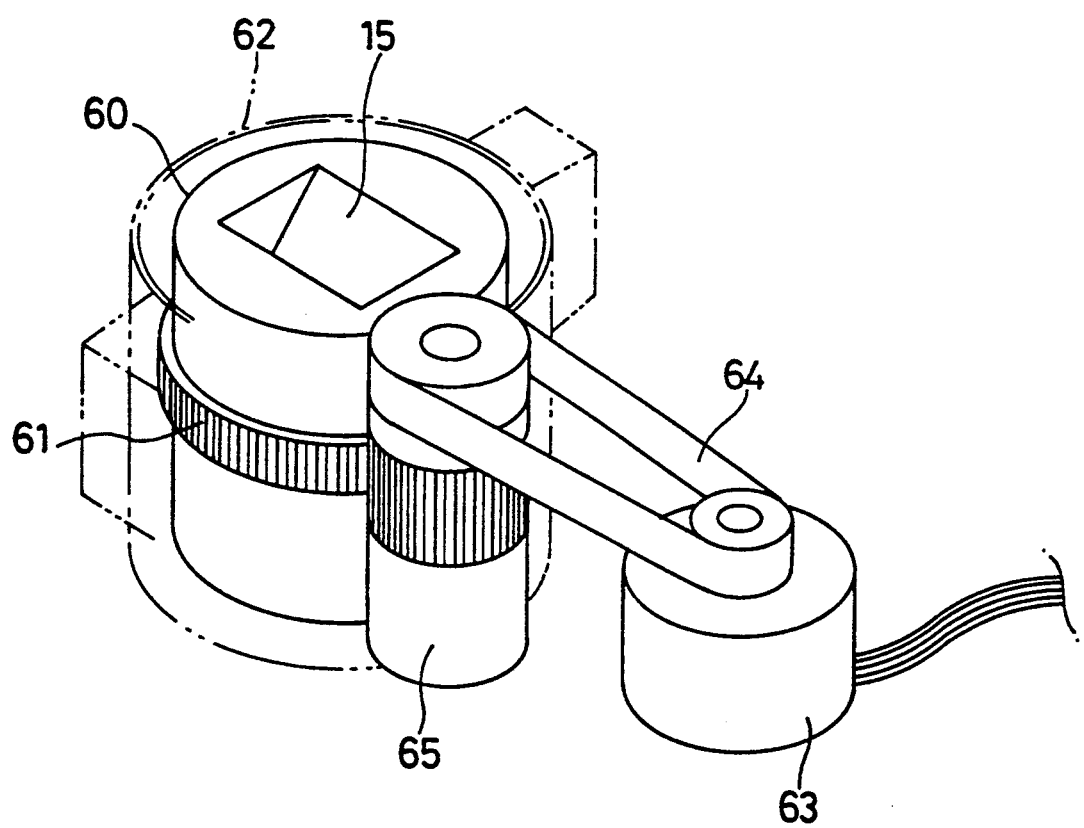
FIG. 5 is a perspective diagram showing the arrangement of the image rotation prism.

Next, the arrangement of the image rotation prism 15 will be explained with reference to FIG. 5. The function of the image rotation prism as an optical device is known in the art and the explanation thereof is omitted, and only the arrangement for rotating the prism will be explained. In the figure, the prism 15 is fitted to a cylindrical member 60 which has a gear section 61 on the exterior wall and is supported rotatably inside an external cylinder 62. The external cylinder 62 has its portion cut away at the position confronting the gear section 61 so that the gear section 61 engages with a pinion 65 which is driven by a pulse motor 63 through a belt 64.

In the foregoing arrangement, when the intended number of pulses are supplied to the pulse motor 63, the image rotation prism 15 is rotated by the angle corresponding to the number of pulses, and consequently the microfilm image is turned by an intended angle, e.g., 90°

Figure 6:
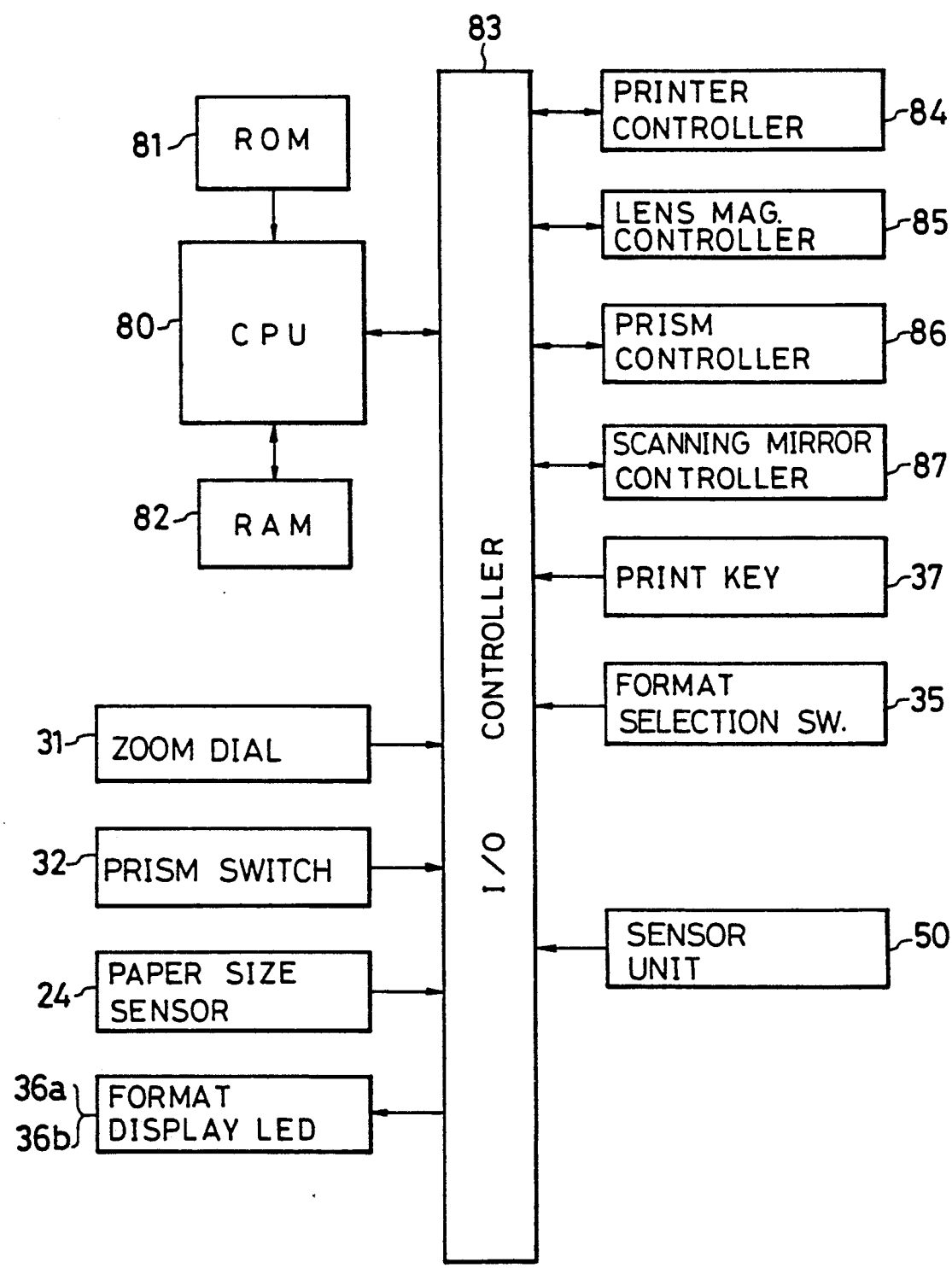
FIG. 6 is a block diagram of the control circuit of the microfilm, reader-printer.

FIG. 6 is a block diagram of the control circuit in the microfilm reader-printer. The circuit includes a CPU 80 and a ROM 81 and a RAM 82 in connection with the CPU 80. Further connected to the CPU 80 through an I/O controller 83 are a printer controller 84, a lens magnification controller 85, an image rotation prism controller 86, a scanning mirror controller 87, the print key 37, the format selection switch 35, the sensor unit detecting the projection lens reference magnification 50, the zoom dial 31, the prism switch 32, the copy paper size sensor 24, and the format display LED 36a and 36b. The CPU 80 incorporates a counter which adds or subtracts the number of pulses supplied to the pulse motor 45 during the drive of the lens.

The printer controller 84 includes a construction of image processing based on electrophotography in which a latent image of the microfilm image formed on the photosensitive drum 22 is transferred to the copy paper using toner. The lens magnification controller 85 operates in response to the signal entered through the zoom dial 31 on the operation panel and data of magnification factor calculated by the CPU 80 to rotate the zoom gear 43 by driving the pulse motor 45 thereby to adjust the projection lens 14 to have the intended magnification. The image rotation prism controller 86 operates in response to the signal entered through the prism switch 32, the signal entered through the format selection switch 36 and the signal indicative of the determination of the activation or inactivation of image rotation made by the CPU 80 in connection with the vertical/horizontal attitude of the image and the orientation of the supplied copy paper, thereby driving the pulse motor 63 to rotate the gear section 61 of the prism cylindrical member 60 so that the image rotation prism 15 is rotated by the intended angle or its initial position is restored.

The scanning mirror controller 87 implements the mirror drive control which includes switching of the light path of the scanning mirror 16 for the reader system or printer system, and scanning of the image in the print operation.

Figure 7A:
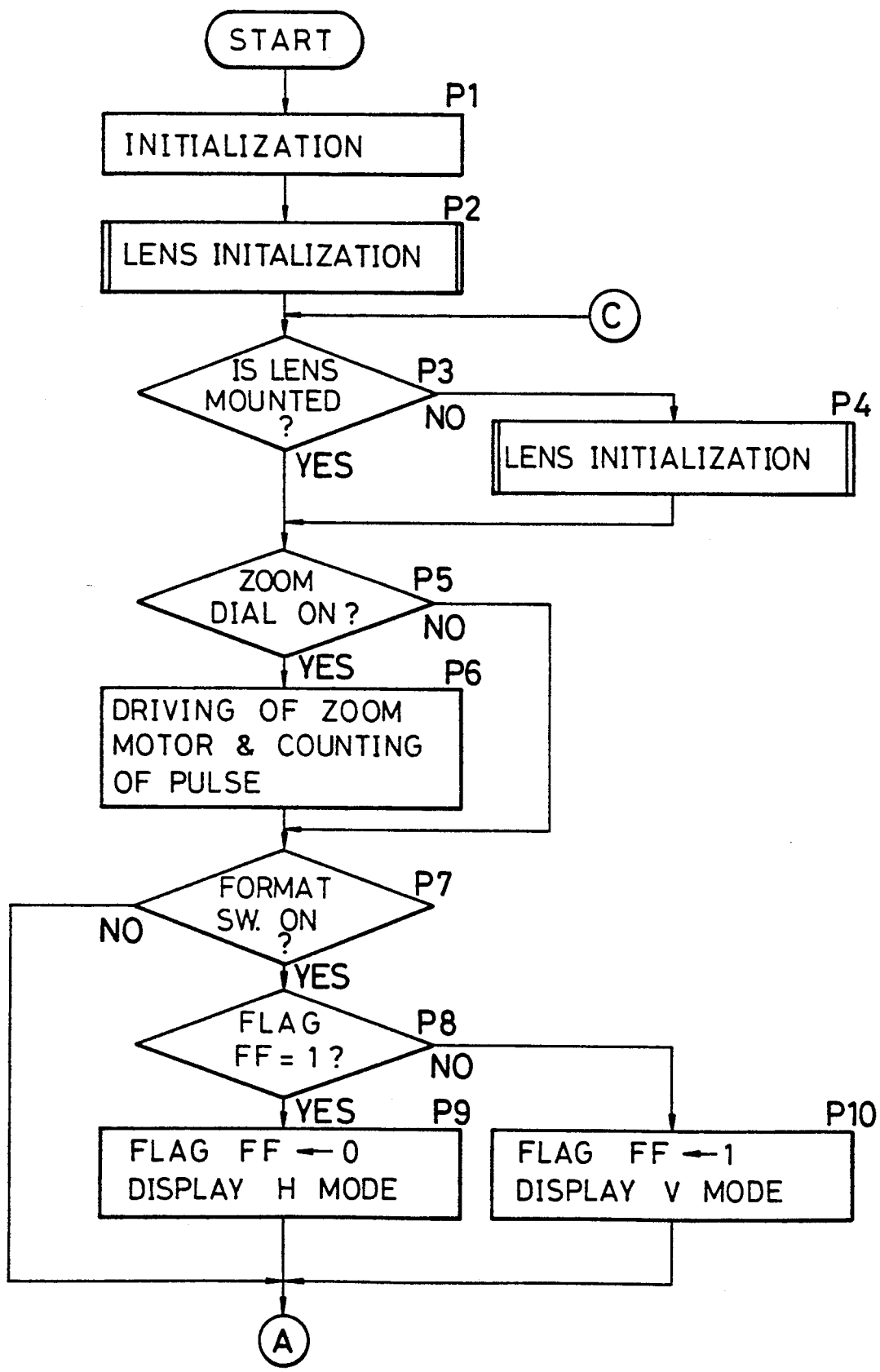
FIGS. 7(a), 7(b) and 7(c) and FIG. 8(a) and 8(b) are flowcharts used to explain the control operation of the control circuit.
Figure 7B:
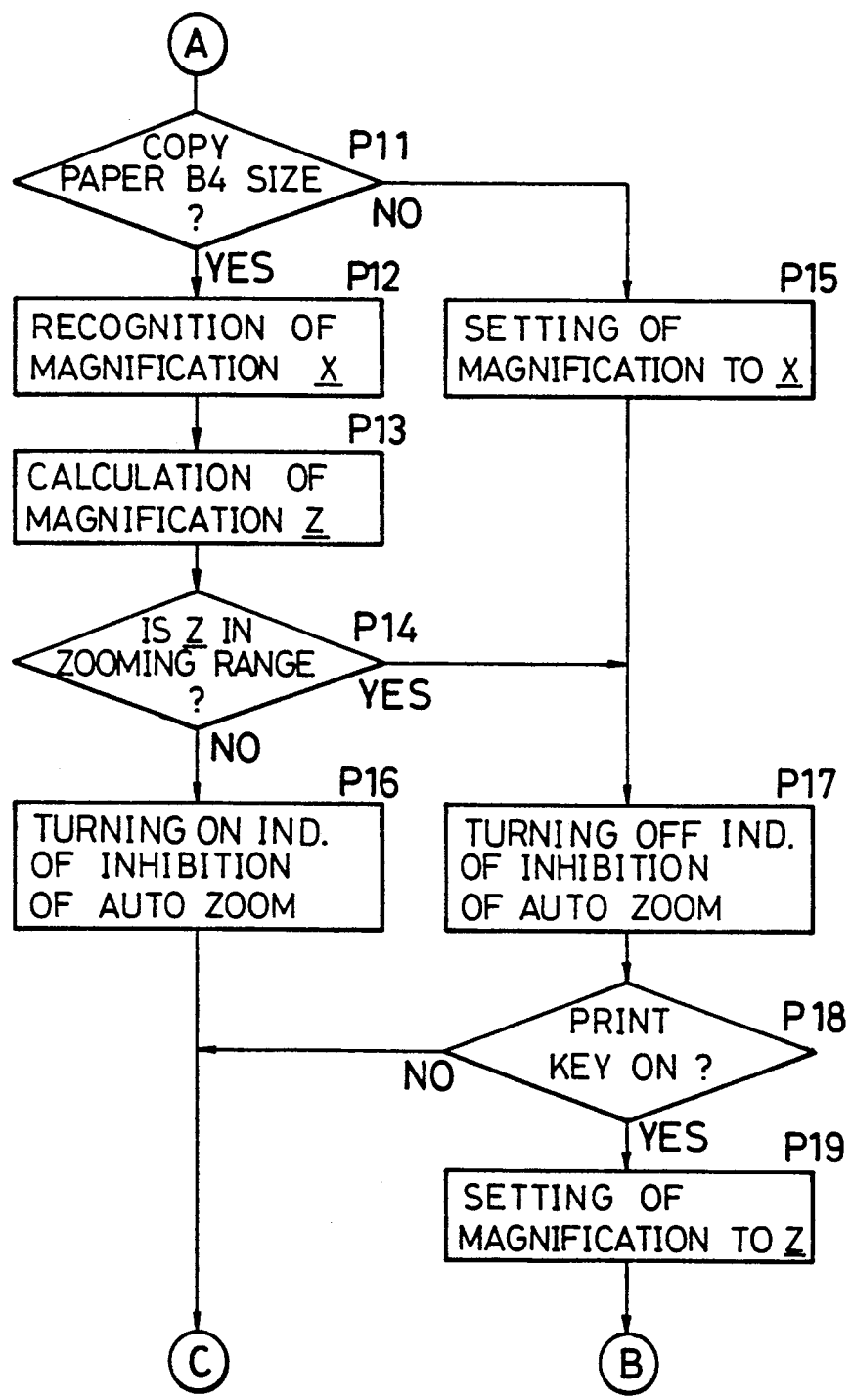
Figure 7C:
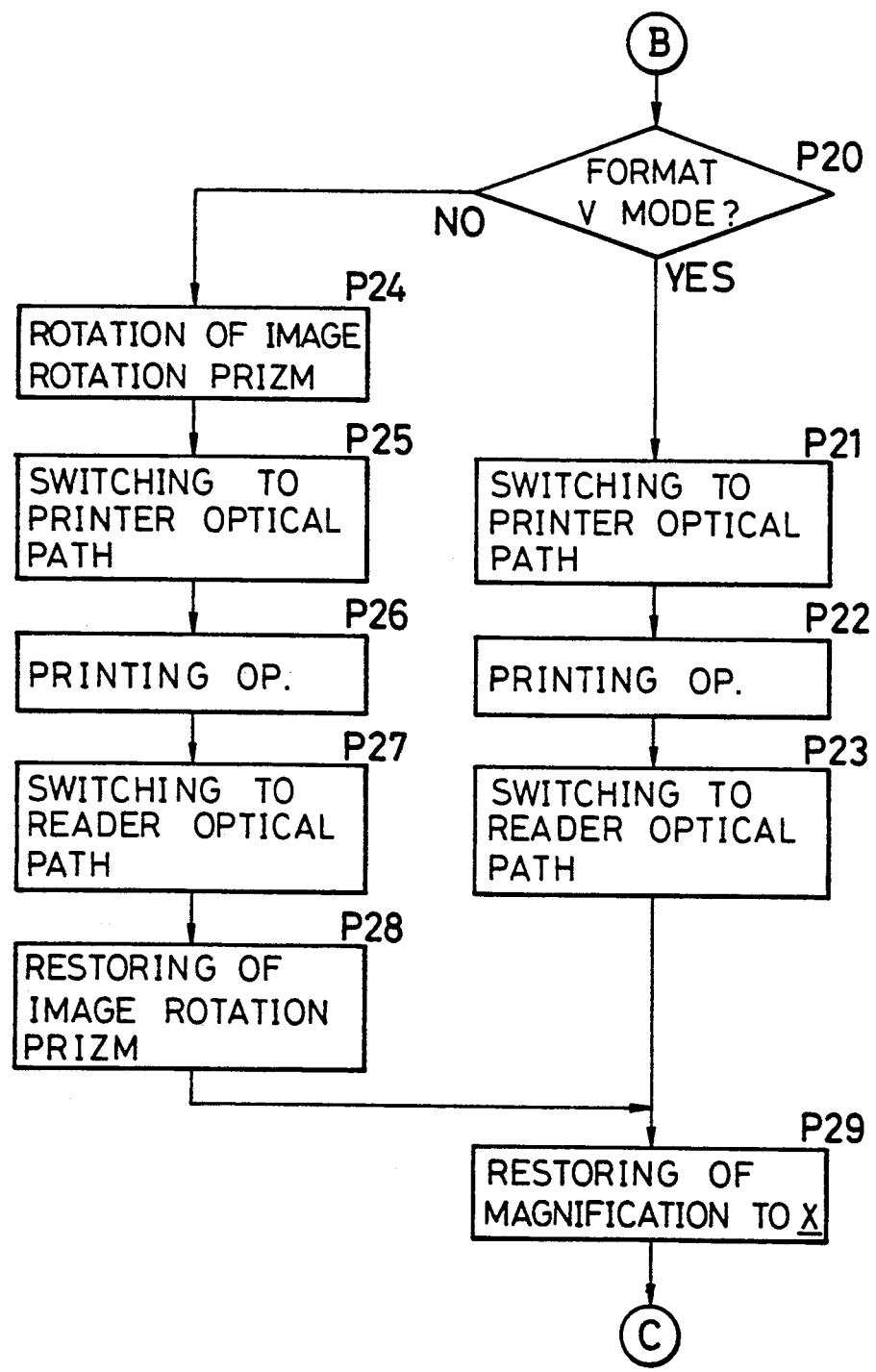
Figure 8:
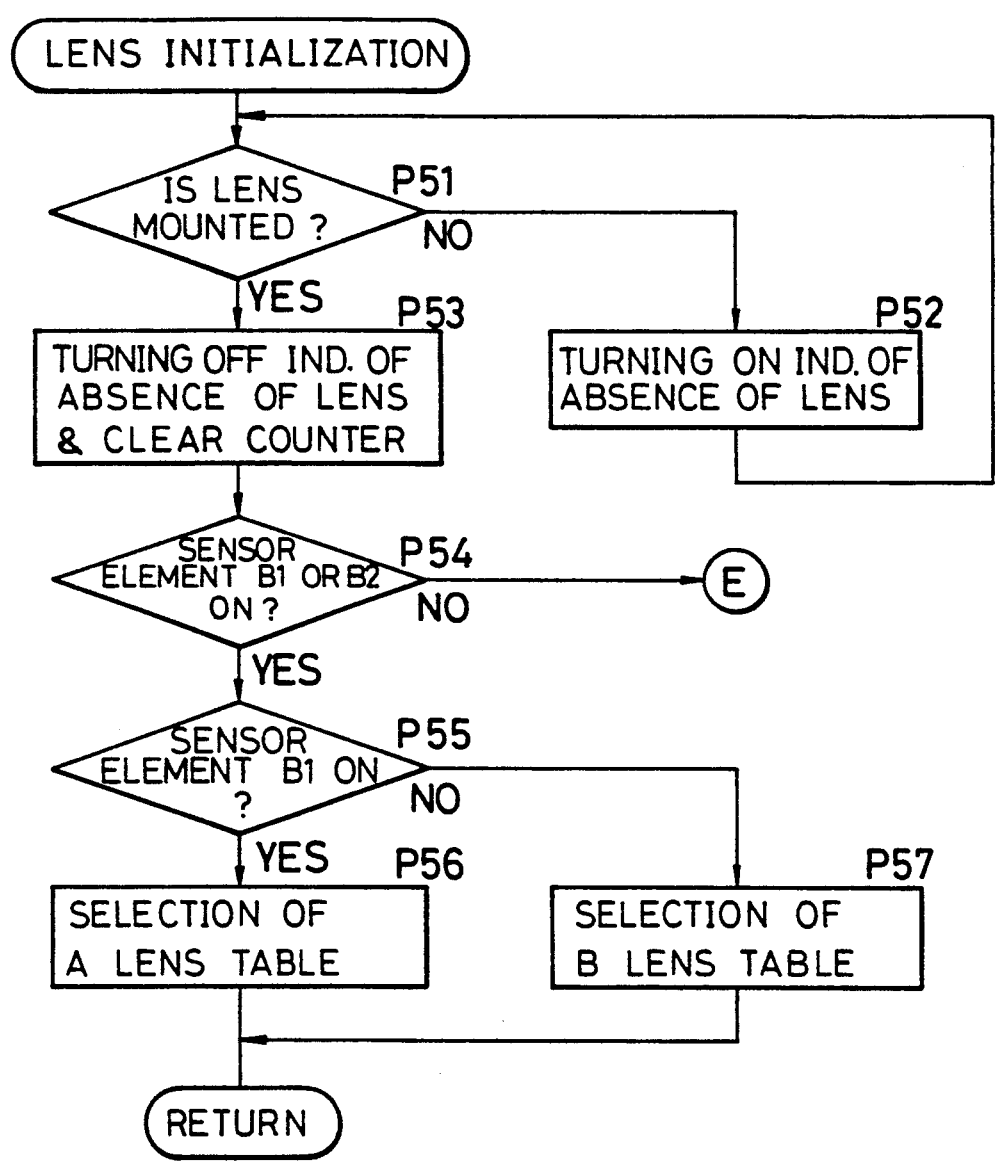
Figure 8:
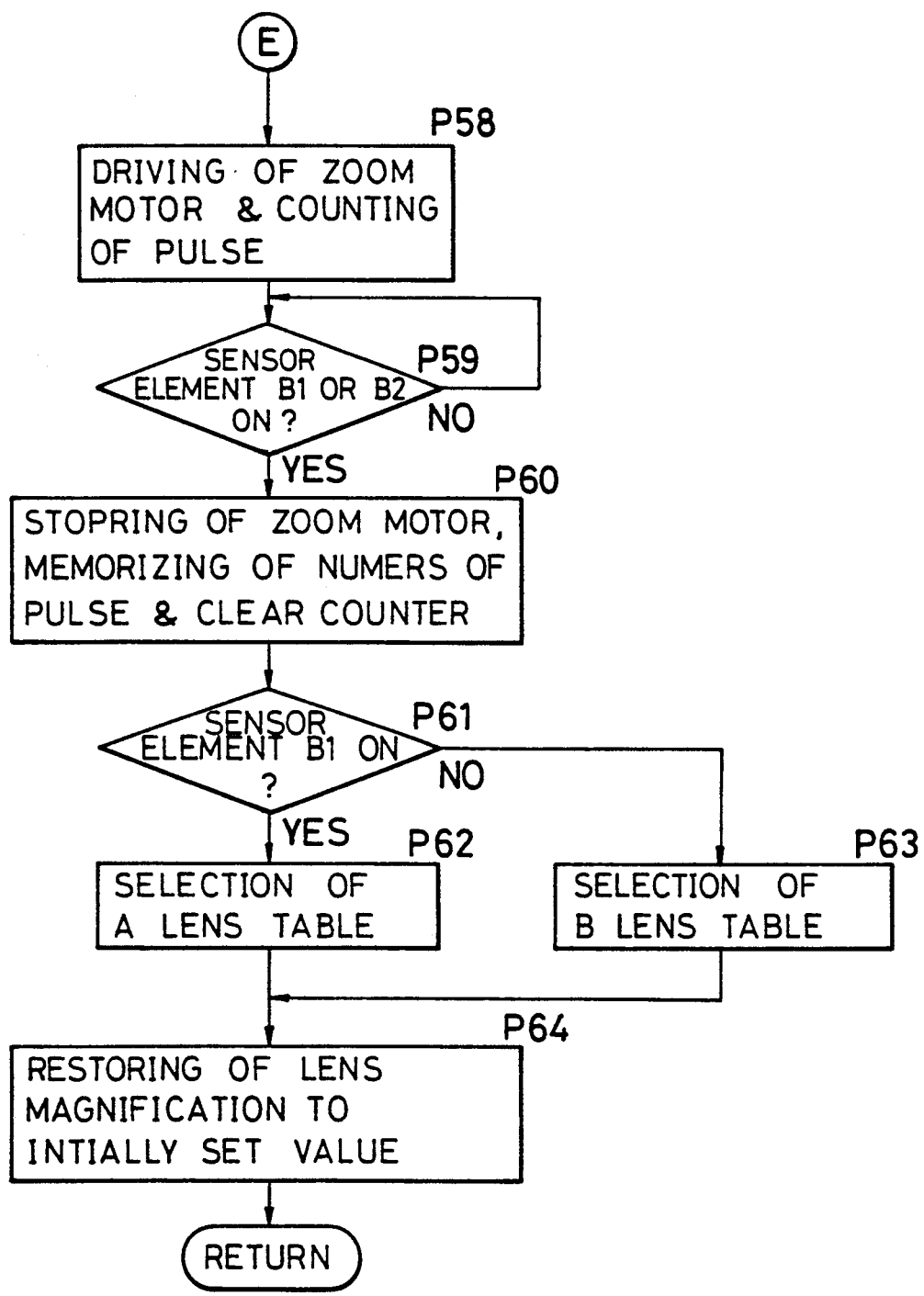

Next, the automatic magnification factor setting control implemented by the CPU 80 will be explained on the flowcharts of FIGS. 7 and 8.

When power supply switch is turned on, the print mode is initialized to the vertical mode for a vertically elongated copy paper, which is indicated on the LED 36a, and the auto zoom mode is set for the projection lens for initialization, which is indicated on the LED (step P1). The magnification of the projection lens is set to the reference value for initialization (step P2). It is tested whether or not the projection lens is mounted (step P3). If no projection lens is yet mounted, the initial setting process for the projection lens takes place (step P4), or otherwise the control sequence proceeds to step P5. Following power-on, the state of mount or dismount of the projection lens is detected continuously in step P3. In step P5, it is tested whether or not a zooming operation has been carried out on the zoom dial 31 of the operation panel. If the implementation of operation is detected, the zoom motor is driven for the prescribed number of pulses in compliance with the direction of operation of the zoom dial 31, and at the same time the prescribed number of pulses is added or subtracted by the counter (step P6). The number of pulses is added when the lens is turned away from the reference magnification position, or it is subtracted for the drive in the opposite direction.

It is tested whether or not the format selection switch 35 is ON (step P7). If the switch is found ON, it is tested whether or not a format flag FF is 1 (step P8). If format flag FF is 1, it is reset to 0 and the format display of the horizontal(H) mode is turned on. If format flag FF is 0, it is set at 1 and the format display of the vertical(V) mode is turned on (steps P9 and P10). The above operation is to switch the display to the vertical mode or the horizontal mode each time the format selection switch is turned on. If step P7 has revealed the switch 35 to be OFF, or after the operations of steps P9 and P10, the control sequence proceeds to step P11, in which it is tested whether or not B4 sized copy paper is selected. In the case of B4 sized copy paper, the magnification X of the projection lens in the reader mode is recognized a follows. The amount of zooming of the projection lens from the reference magnification position is memorized in terms of the number of pulses in the counter, and based on this value the magnification calculation table for the relevant lens stored in the ROM 81 is referenced to determine the magnification X for the reader mode (step P12). Tables 1 and 2 show, as an example, the relationship between the number of pulses and the magnifications provided by the magnification calculation table.

TABLE 1

| For zoom lens of magnifications ×9 to ×16 (part) | | |
|---|---|---|
| | magnification | number of pulses |
| reference magnification | ×9 | 0 |
| | ×9.5 | 40 |
| | ×10 | 80 |
| | ×10.5 | 120 |
| | ×11 | 160 |

TABLE 1-continued

For zoom lens of magnifications ×9 to ×16 (part)

| magnification | number of pulses |
|---|---|
| ×11.5 | 200 |
| ×12 | 240 |
| ×12.5 | 280 |
| ×13 | 320 |
| ×13.5 | 360 |
| ×14 | 400 |
| ×14.5 | 440 |
| ×15 | 480 |
| ×15.5 | 520 |
| ×16 | 560 |

TABLE 2

For zoom lens of magnifications ×13 to ×27 (part)

| | magnification | number of pulses |
|---|---|---|
| reference magnification | ×13 | 0 |
| | ×14 | 40 |
| | ×15 | 80 |
| | ×16 | 120 |
| | ×17 | 160 |
| | ×18 | 200 |
| | ×19 | 240 |
| | ×20 | 280 |
| | ×21 | 320 |
| | ×22 | 360 |
| | ×23 | 400 |
| | ×24 | 440 |
| | ×25 | 480 |
| | ×26 | 520 |
| | ×27 | 560 |

A correction factor Y of the case of switching from the reader mode to the printer mode, which is the longitudinal dimension of B4 size copy paper divided by the longitudinal dimension of the marked area on the screen, is multiplied with the magnification X of the reader mode which is set currently on the projection lens thereby to evaluate a magnification Z (magnification for copy) of the printer mode for printing the image which is projected in the size of marked area on the screen 18 (step P13). The correction factor Y is stored in advance in the memory, and it is read out for the above calculation.

It is tested whether or not the calculated magnification Z of the printer mode is within the range of zooming of the projection lens (step P14). If the magnification Z is outside the zooming range, the inhibition of auto zoom is indicated (step P16), and the control sequence proceeds to step P3. If step 14 has revealed the magnification Z to be within the zooming range, the indicator of auto zoom inhibition is turned off (step P17).

If B4 copy paper is not selected, where printing takes place with the magnification X of the reader mode being applied intact and the auto zoom arrangement is not operated, with the magnification Z of the printer mode being left intact to be the magnification X of the reader mode (step P15), and the control sequence proceeds to step P17.

When the print key 37 is turned on, with the auto zoom inhibition indicator being turned off (step P18) the magnification of the projection lens is set to the magnification Z for printer (step P19). It is tested whether or not the print format is a vertical mode (step P20). In the case of the vertical mode, the projection light path is switched to the light path for printing, and the print operation is carried out, and thereafter the projection light path is restored to the reader light path (steps P21, P22 and P23). In the case of a horizontal mode, the image rotation prism is rotated so that the projected image is turned by 90°, the projection light path is switched to the printing light path, the print operation is carried out, and the projection light path is restored to the reader light path (steps P24, P25, P26, P27 and P28). Subsequently, the magnification of the projection lens is restored to the magnification X of the reader mode (step P29), and the control sequence returns to step P3.

Next, the details of the initializing operation for the projection lens shown by steps P2 and P4 in the flowchart of FIG. (a) will be explained with reference to the flowchart of FIG. 8(a) and 8(b). This embodiment is the case of initialization for two kinds of zoom lenses of magnification x9-x16 (lens A) and of magnification x13-x27 (lens B).

Initially, it is tested whether a projection lens is mounted (step P51). In this embodiment, this operation is based on whether or not the light receiving elements $B_1$ and $B_2$ receive the light from the light emitting elements $A_2$ and $A_2$ of sensor unit 50. If both the light receiving elements $B_1$ and $B_2$ receive the light from the respective light emitting elements, i.e., if both the light receiving elements $B_1$ and $B_2$ are in the ON state, it is judged that no projection lens is mounted, or if at least one of the light receiving elements $B_1$ and $B_2$ is found to be in the OFF state, it is judged that the projection lens is mounted.

In response to the judgement of the absence of projection lens, it is indicated on the operation panel (step P52) so that the attachment of the projection lens is prompted. In response to the judgement of the attachment of the projection lens, the indicator of the absence of the projection lens is turned off, the counter is cleared (step P53), and it is tested based on the state of the light receiving element $B_1$ or $B_2$ as to whether or not the reference magnification is set for the lens (step P54). In response to the ON state, the state of the light receiving element $B_1$ is tested to find whether the lens A among the two lenses is ON (step P55), and in this case the magnification calculation table (Table 1) for the lens A stored in the ROM 81 is selected, or in another case the magnification calculation table (Table 2) for the lens B stored in the ROM 81 is selected (steps P56 and P57), and the control sequence returns to the main routine.

If the step P54 has revealed that both the light receiving elements $B_1$ and $B_2$ of the sensor unit 50 are OFF, indicating that the reference magnification is not set, the zoom motor is driven so that the lens is operated toward the reference position, with drive pulses being counted by the counter, and the arrival at the reference magnification position is tested by means of the light receiving element $B_1$ or $B_2$ (step P59). The drive operation for the lens toward the reference magnification position is preferably implemented on expiration of a prescribed time after the lens has been mounted, or upon detecting that the door at the lens stage is closed. Namely, the drive operation for the lens toward the reference magnification position is preferably commenced after the lens has been mounted completely.

At the arrival of the reference magnification position of the lens, the zoom motor is disactivated, the count value is stored in the memory, and the counter is cleared (step P60). Subsequently, discrimination of lens A or not is implemented based on the state of the light receiving element $B_1$ (step P61), and a relevant magnification calculation table for lens A or B is selected (steps P62 and P63) in the same manner as the preceding steps P56 and P57. The zoom motor is driven reversely for the number of pulses which has been stored in the memory in step P60, so that the magnification of the projection lens at the time when it was mounted is restored (step P64), and the control sequence returns to the main routine.

In this manner, it is possible to recognize the magnification of the mounted lens at the initializing operation for the projection lens even if the reference magnification has not been set.

Although in the foregoing embodiment the size of copy paper to be used is selected through the mounting of the paper supply cassette, which accommodates copy paper of the intended size, to the main unit of the microfilm reader-printer, an alternative scheme is to provide the main unit with the facility of mounting several paper supply cassettes and the size of copy paper to be used is selected through the selection of the paper supply cassette. Instead of providing the corner marks for the B4 size and A4 size separately, the corner marks for these sizes may be made common. Alternatively, the apparatus may be designed to be operative to print A3 sized copy paper, with the corner marks for the A3 size and B4 size being made common.

In printing larger copy paper, the zooming function of the projection lens is used in order to have different sizes of projected image in the reader mode and printer mode. However, the size which is going to have by alteration is determined in advance, and therefore it is also possible to alter the size of projected image by means of a conversion lens or the like. In this case, a projection lens which does not have a zooming function may be used.

As described above, the inventive microfilm reader-printer has its screen dimensioned smaller than the maximum size of copy paper to be used by the apparatus, and in the case of selection of larger copy paper, the size of projected image is expanded to the size suitable for that copy paper in response to the switching from the reader mode to the printer mode, whereby it is not necessary to have a screen equal in size to the maximum copy paper, and consequently the apparatus can be made compact through the provision of reduced screen dimensions. In consequence, it becomes possible to place the screen at the position where the operator can view the display easily. For images which are printed on copy paper of a frequently used size, their projected dimensions on the screen are not altered, and the resolution of displayed images when the apparatus is used as a reader is retained.

What is claimed is:

1. A microfilm reader-printer operative in a reader mode in which an image of a microfilm is projected on a screen, and in a printer mode in which the image is projected on an image recording section so that the image is formed on a paper, said microfilm reader-printer comprising:
    a plurality of size indexes provided on the screen in correspondence to a plurality of paper sizes, one size index corresponding to a paper size larger than a predetermined size being set smaller than the paper size, and the other size index corresponding to a paper size smaller than or equal to the predetermined size being set substantially equal to the paper size;
    altering means for altering the size of the projected image; and
    means for controlling said altering means so that the size of the projected image is expanded if the size of the paper on which the image is to be formed is larger than the predetermined size, in response to switching from the reader mode to the printer mode.

2. A microfilm reader-printer according to claim 1, wherein said altering means uses a projection lens of variable magnification type to alter the size of the projected image.

3. A microfilm reader-printer according to claim 2, wherein said control means includes means for detecting the size of the paper.

4. A microfilm reader-printer operative in a reader mode in which an image of a microfilm is projected on a screen, and in a printer mode in which the microfilm image is projected on an image recording section so that the image is formed on a paper, said microfilm reader-printer comprising:
    altering means for altering a projecting magnification; and
    means of controlling said altering means so that the projecting magnification for the reader mode is made smaller than the magnification for the printer mode when an image corresponding to a paper size larger than a predetermined size is projected, and the projecting magnification for the reader mode and the projecting magnification for the printer mode are made substantially equal to each other when an image corresponding to a paper size smaller than or equal to the predetermined size is projected.

5. A microfilm reader-printer according to claim 4, wherein said altering means comprises a zoom lens.

6. A microfilm reader-printer according to claim 5, wherein said control means includes means for detecting the size of the paper.

* * * * *